June 22, 1943. C. A. GUSTAFSON 2,322,437
DUMP WAGON
Filed June 13, 1941
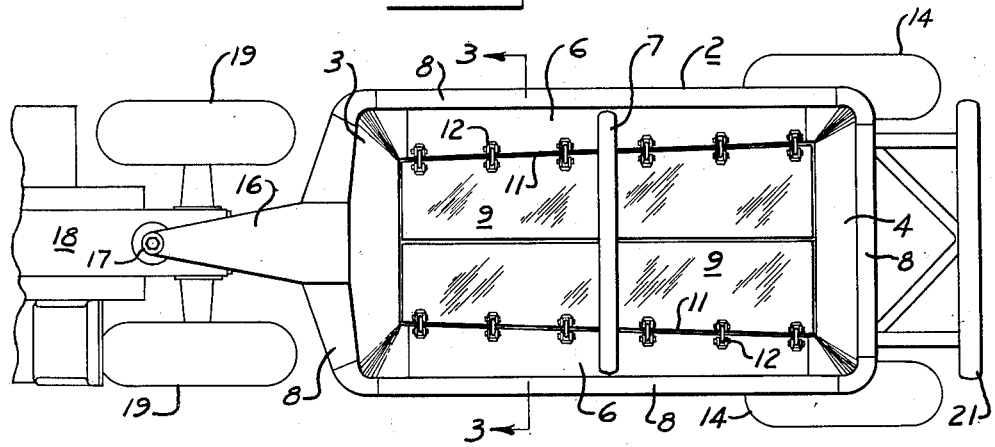
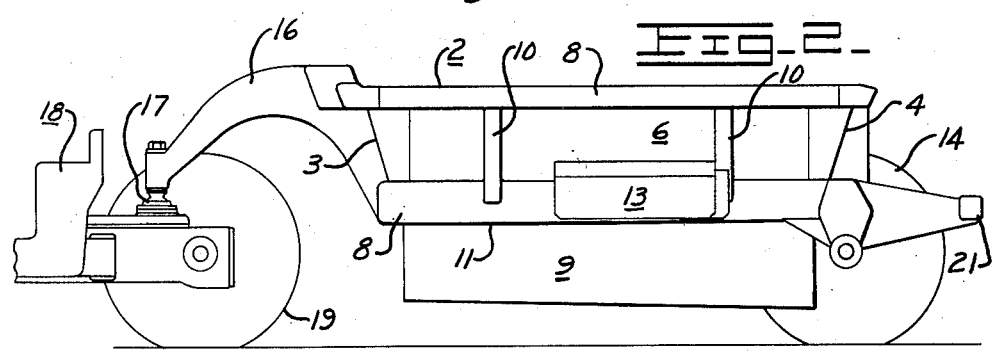
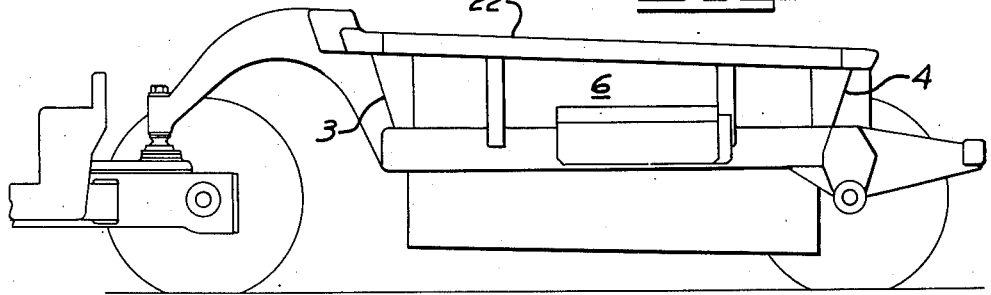
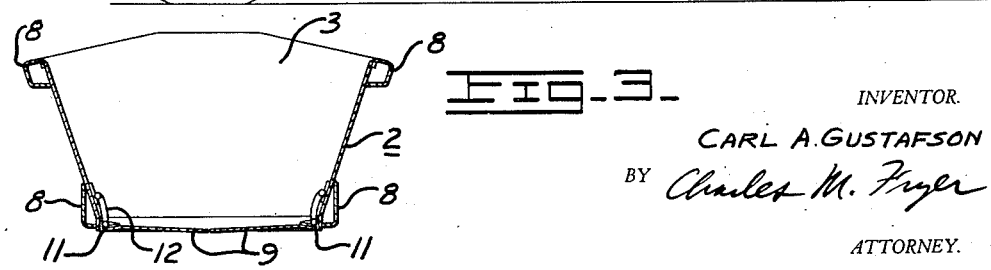
INVENTOR.
CARL A. GUSTAFSON
BY Charles M. Fryer
ATTORNEY.

Patented June 22, 1943

2,322,437

UNITED STATES PATENT OFFICE 2,322,437

DUMP WAGON

Carl A. Gustafson, Peoria, Ill., assignor to Caterpillar Tractor Co., San Leandro, Calif., a corporation of California Application June 13, 1941, Serial No. 397,919

6 Claims. (Cl. 298—35)

My invention relates to dump wagons, and more particularly to relatively large capacity heavy duty dump wagons of the hopper type having bottom dump doors.

In such wagons, opposite door means are usually provided for the bottom of the dump wagon, which are hingedly connected at their outer edges adjacent the lower edges of the side walls so as to swing outwardly and downwardly for dumping of a load. Heretofore, the hinge connections for the doors have been such that when the doors are opened for dumping of a load, they are substantially parallel to each other along their entire length. As a result, when the dump wagon is moved forwardly so as to pull away from a dumped load, such arrangement causes considerable frictional drag along the entire length of the doors as they move past a dumped load. My invention is designed to obviate this difficulty, and, therefore, has as its objects, among others, the provision of an improved dump wagon door arrangement, which will facilitate slipping of the doors away from a dumped load with minimum drag or frictional resistance when the dump wagon is moved forwardly away from a dumped load, and which is of economical and simple construction. Other objects of my invention will become apparent from a perusal of the following description thereof.

In general, the door means of my invention are so hingedly connected, at their outer edges adjacent the bottom edges of the side walls of a dump wagon body, as to converge toward the front of the body when the doors are open for dumping of a load. Thus, the spacing between the doors, when they are open, is rendered progressively narrower from the rear toward the front of the dump wagon body. Consequently, such doors will slip past a dumped load with minimum frictional drag as the dump wagon is moved forwardly.

Reference is now made to the drawing for a more detailed description of my invention, in which:

Fig. 1 is a more or less schematic plan view of a dump wagon incorporating the construction of my invention, illustrating such dump wagon connected to a tractor, a portion of which is shown in the view.

Fig. 2 is a more or less schematic side elevation of the structure shown in Fig. 1.

Fig. 3 is a section taken in the plane indicated by line 3—3 in Fig. 1.

Fig. 4 is a more or less schematic side elevation, similar to Fig. 2, of a modified form of construction in which the capacity of the dump wagon body is increased adjacent its front end.

Although the construction of my invention is applicable to any hopper type of dump wagon having opposite bottom door means which are adapted to swing outwardly and downwardly from the bottom edges of the sides of the dump wagon body for dumping of a load, I have chosen for purposes of illustration, a dump wagon of the heavy duty type which is now being employed commercially on a wide scale and which has a gooseneck hitch connection with a tractor, thus forming a tractor-trailer combination, in which the dump wagon is the trailer vehicle. The dump wagon comprises body 2 having front end wall 3, rear end wall 4, and side walls 6 connecting the front end wall and the rear end wall. Preferably, all of such walls slope inwardly from their upper edges to provide a hopper construction of less area at the bottom than at the top, to facilitate dumping of a load. Usually, a central reenforcing bracing structure 7 is connected between side walls 6; and the upper and the lower edges of the side and end walls are usually reenforced by tubular reenforcing rail structures 8. For providing additional strength, the top and bottom side rail structures 8 may be joined by outside reenforcements 10.

The bottom of the dump wagon is formed by opposite doors 9 which extend substantially the entire length of body 2 between front wall 3 and rear wall 4, and which are hingedly connected at their outer edges 11 adjacent the lower edges defining side walls 6, by hinge means 12 which may be of any suitable construction. Thus, in their closed position, doors 9 provide a closed bottom for such dump wagon, as is illustrated in Fig. 1, but by virtue of their hinged connections along their outer edges, they are adapted to swing outwardly and downwardly for dumping of a load, as is illustrated in Fig. 2. Any suitable means (not shown), either hydraulic or mechanical, may be employed for effecting closing of the doors after a load has been dumped. Usually, such means is of the type which permits opening of the doors by gravity when it is desired to dump the load, but which holds the doors closed when the wagon is transporting such load. In the embodiment of the invention illustrated, housing structure 13, at one side of body 2 is provided for enclosing door operating mechanism.

At its rear end, body 2 is supported in elevated position, so as to provide ample ground clearance for doors 9 when they are open, upon rear wheels 14 which in present commercial constructions usually embody heavy duty pneumatic tires. As can be observed from Fig. 1, such wheels 14 are widely spaced apart; the spacing being preferably much greater than the combined width of the doors so as to enable the wheels to pass readily by a dumped load. The front of the dump wagon is provided with a gooseneck hitch 16 which is universally connected at 17 to tractor 18 which is preferably of the wheeled type so as to be capable of relatively high speed travel and which is also provided with heavy duty pneumatic tires on such wheels, the rear wheels 19 of which are shown. Ample clearance is provided beneath hitch 16 for clearance of wheels 19, to enable sharp turning of the tractor with respect to the dump wagon. On occasions, the dump wagon may be working in loose or muddy earth; and tractor 18 may not have sufficient power to pull it out of such earth when the wagon is loaded. To enable an auxiliary pusher tractor to help move the load on such occasions, bumper 21 is provided at the rear of the dump wagon, which may serve as an abutment for such pusher tractor.

In prior constructions, the hinge connection lines along the outer edges 11 of the doors, are substantially parallel along their entire length. As a result, when the doors are swung open to dumping position, they are substantially parallel, or in other words, the same distance apart along their entire length. Such arrangement presents considerable frictional drag when the doors are opened and move past a dumped load as the wagon is pulled forwardly, due to the fact that the load tends to spread outwardly.

The dump wagon of my invention overcomes this difficulty by having the hinge connection lines of the doors, as is determined by their outer edges 11, progressively converge toward the front end 3 of the wagon. Consequently, when the doors are opened to dumping position, they will also converge toward such front end 3, so as to be closer together at the front than at the rear, with the result that the wagon will more readily slip away from a dumped load when it is moved forwardly. Such converging of the hinge connection lines may be any suitable degree depending upon the size and load capacity of the wagon. Usually, the upper side edges of a dump wagon body are constructed to be substantially parallel with respect to each other along their entire length. With such arrangement, the forward converging of the hinge line connections between the outer edges 11 of the doors and the bottom edges of side walls 6, may be readily accomplished by sloping such side walls from the top side edges toward the front, so as to converge toward the front of the wagon, as is illustrated in Fig. 1.

By converging side walls 6 toward the front of the dump wagon body, the load capacity of such body will progressively decrease if the height of such side walls remains the same throughout their length. This may be objectionable because in a tractor-trailer dump wagon combination, where the front end of the dump wagon is supported directly on the tractor by a gooseneck hitch connection of the type disclosed herein, it may be desirable to have as much of the dump wagon load as possible rest upon the tractor to enhance traction of the tractor. Therefore, to compensate for decrease in capacity toward the front of the dump wagon body by virtue of the forwardly converging side walls 6, I may, as is illustrated in Fig. 4, increase the height of the side walls 6 toward the front of the dump wagon body and make the front end wall 3 higher, so as to increase the vertical load carrying capacity toward the front of such body.

If the bottom of the dump wagon is substantially parallel to the ground, the vertical load carrying capacity toward the front may be made to increase progressively by causing the upper edges 22 of the side walls 6 to slope upwardly toward the front of the body. On the other hand, with the upper edges of the dump wagon body substantially parallel to the ground, the same effect may be produced by sloping the lower edges of the side walls downwardly toward the front; or if desired both the upper edges and the lower edges of the dump wagon side walls may be non-parallel to the ground, and arranged so as to diverge away from each other toward the front.

Not only will the described arrangement of increasing the vertical load carrying capacity of the dump wagon toward the front, enable compensation for reduction of lateral capacity by virtue of the forwardly converging side walls, but it is readily apparent that the height of the side walls may be made to increase toward the front any desired amount, for providing a vertical load carrying capacity more than that necessary to compensate for the decrease in lateral load carrying capacity. If this is done, the tractor may be caused to carry more weight of the dump wagon body than is supported on the rear wheels thereof, to thereby increase traction. In this connection, even though the capacity of the dump wagon may be greater at the front than at the rear, the fact that converging of the side walls toward the front, provides a bottom opening narrower at the front than at the rear, tends to enhance uniformity in the height of the dumped load as the wagon is pulled forwardly while simultaneously dumping the load, because then the rate of dumping will be slower at the front. Thus, it will be readily apparent that for any desired capacity dump wagon, the progressive decrease in lateral load capacity toward the front for enabling the doors to be closer together at the front than at the rear so as to facilitate their slipping past a dumped load, may be so correlated with the progressive increase in vertical load capacity toward the front, as to provide not only increase of load support on the tractor but substantially uniform dumping of the load.

I claim:

1. A dump wagon body having side walls, and a bottom closable by opposite door means hingedly connected at their outer edges adjacent said side walls so as to swing downwardly for dumping of a load, the hinge connections of said door means being such that when said door means are open they are closer together at the front of said body than at the rear thereof to facilitate their slipping away from a dumped load when the wagon is moved forwardly.

2. A dump wagon body having a front end wall, a rear end wall, side walls connecting said end walls, and a bottom closable by opposite doors hingedly connected at their outer edges adjacent said side walls so as to swing downwardly for dumping of a load, said doors extending substantially the entire length of said body between said front wall and said rear wall, and the hinge connections of said doors being along lines that converge toward said front end wall so that when said doors are open they converge toward said front end wall to facilitate their slipping away from a dumped load when the wagon is moved forwardly.

3. A dump wagon body having side walls which converge toward the front of said body so as to provide bottom edges which also converge toward said front, and a bottom closable by opposite doors hingedly connected at their outer edges adjacent said converging bottom edges whereby when said doors are open they converge toward said front to facilitate their slipping away from a dumped load when the wagon moves forwardly.

4. A dump wagon body having side walls substantially parallel adjacent their upper edges but which slope inwardly from said upper edges and converge toward the front of said body to provide bottom edges which also converge toward said front, and a bottom closable by opposite doors hingedly connected at their outer edges adjacent said converging bottom edges whereby when said doors are open they converge toward said front to facilitate their slipping away from a dumped load when the wagon moves forwardly.

5. A dump wagon body having side walls which converge toward the front of said body so as to provide bottom edges which also converge toward said front, said side walls being higher at the front than at the rear to increase the load carrying capacity of said body adjacent the front for enabling better weight distribution upon a tractor or the like upon which the front of said body may be connected, and a bottom closable by opposite doors hingedly connected at their outer edges adjacent said converging bottom edges whereby when said doors are open they converge toward said front to facilitate their slipping away from a dumped load when the wagon moves forwardly.

6. A dump wagon body having side walls, and a bottom closable by opposite door means hingedly connected at their outer edges adjacent the side walls so as to swing downwardly for dumping of a load, the hinge connections of such door means being such that when the door means are open they are closer together at the front of the body than at the rear thereof to facilitate their slipping away from a dumped load when the wagon is moved forwardly, the side walls being higher at the front of the body than at the rear to compensate for decrease in load carrying capacity resulting from the aforementioned hinge connections of the door means.

CARL A. GUSTAFSON.